Dec. 6, 1960   E. J. HELLUND   2,963,044
ATTENUATION OF PULSATIONS IN FLUID LINES
Filed Aug. 4, 1958   2 Sheets-Sheet 1
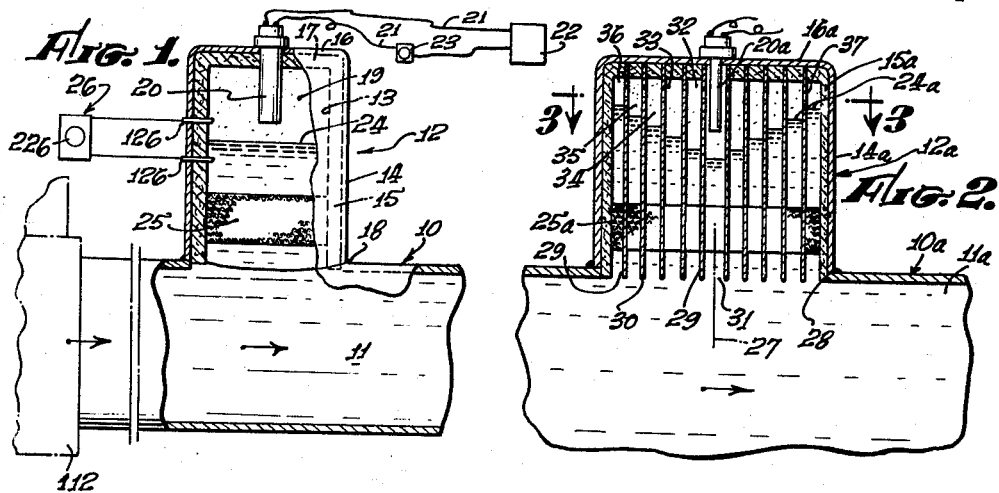
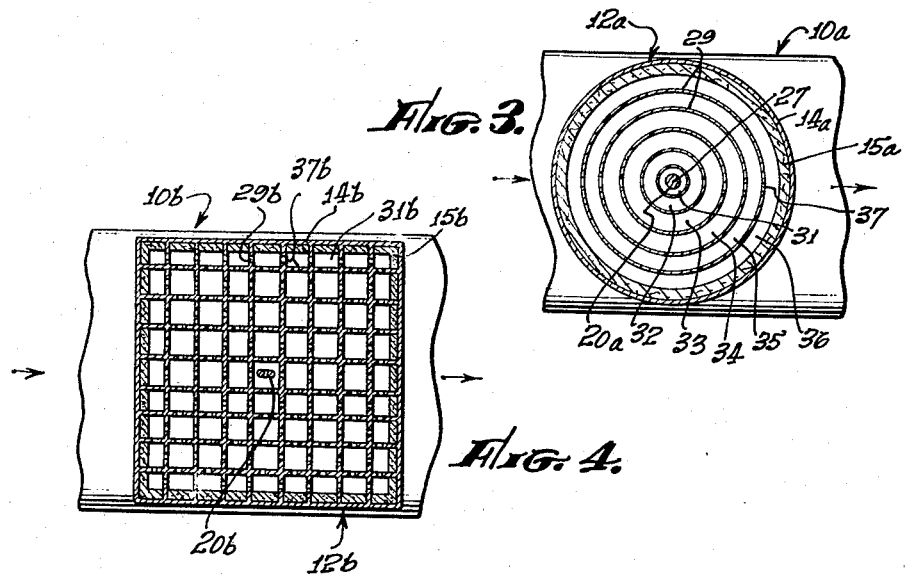
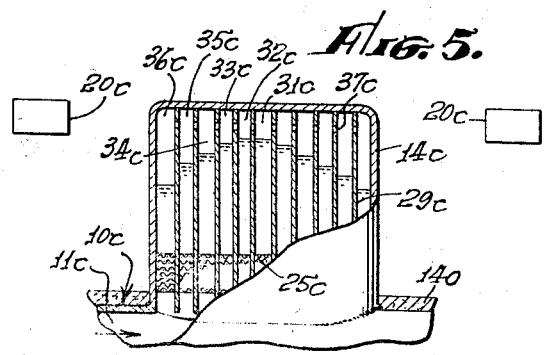
EMIL J. HELLUND,
INVENTOR.
BY William P. Green
ATTORNEY.

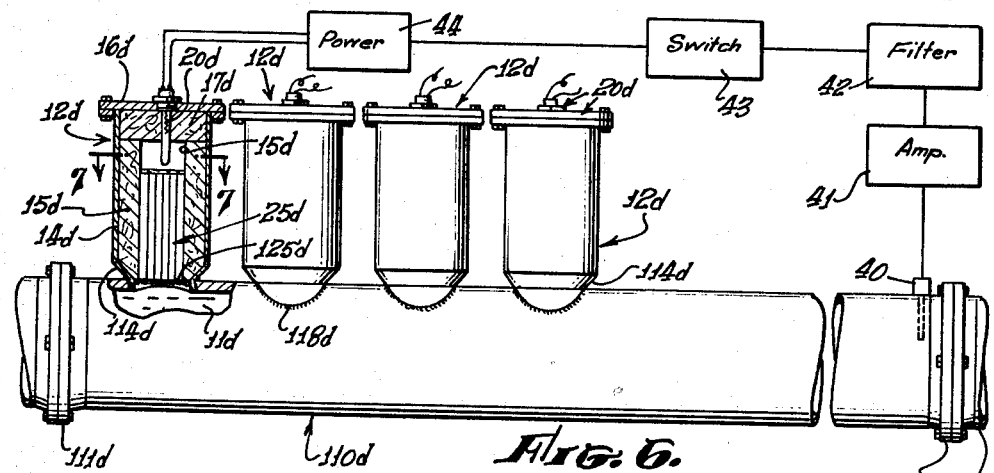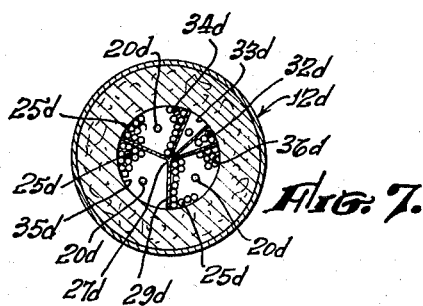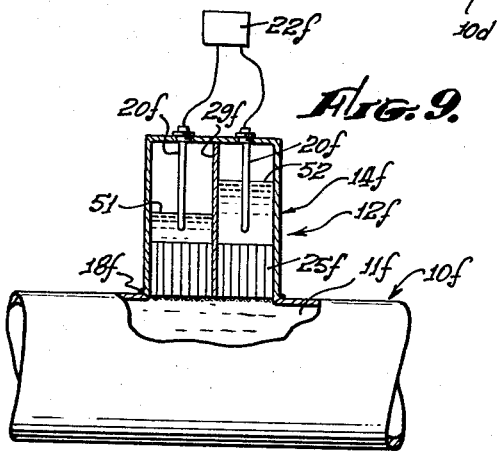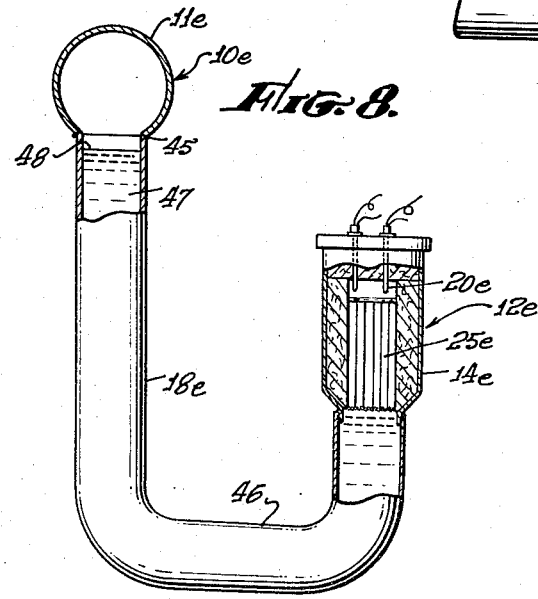

2,963,044

ATTENUATION OF PULSATIONS IN FLUID LINES

Emil J. Hellund, 32161 South Coast Highway,
South Laguna, Calif.

Filed Aug. 4, 1958, Ser. No. 752,862

7 Claims. (Cl. 138—30)

This invention relates to improved devices for attenuating pressure pulsations in a fluid system.

One of the most troublesome problems which is encountered in fluid pumping systems is the problem of eliminating pressure pulsations or waves (both audible and inaudible) from the system. Such pulsations are frequently caused by the operation of a pump, or may be caused by any number of different conditions which may occur in the system. For example, they may be produced merely by motion of the fluid along the walls of a pipe, or around a bend, or through a narrow passage. To mention a particular pulsation problem of current interest, relatively strong and very bothersome pulsations are frequently developed in the fuel supply lines of missiles, by reason of variations in the rate of burning of the fuel. In addition to these various possible sources of pulsations in a fluid line, it is also possible for pulsations to "leak" into a system through the piping walls. That is, a vibration present in the piping walls may produce a pumping action on the fluid being transmitted by the pipe, and this pumping action will then result in the development of pressure pulsations or waves in the fluid.

In the case of any of the mentioned types of pulsations, the worst difficulties of course occur when the pulsations are at a frequency at which some portion of the piping or system will resonate. In this case, a relatively small initial pulsation source may cause a wave of such magnitude that the pulsations will result in great damage to the system, and/or will produce a very troublesome noise problem.

In the past, numerous different types of attenuators have been devised with the purpose of eliminating pulsations from a fluid system. However, each of the prior devices with which I am familiar has had at least one very decided disadvantage. For example, some of these previous attenuators have operated on a reflective principle, according to which they are intended to reflect any pressure waves or pulsations back toward their source. However, this type of device has the disadvantage that the reflected wave may, under some circumstances of resonance, actually add to or amplify another subsequent wave at the source, and may therefore result in a more severe pulsation problem than would occur if no attenuator at all were used.

A second general type of attenuator is the "side branch" type, in which there is provided a side branch chamber or "stub" connected to the main pipeline and containing a body of fluid which is in communication with that in the main line. The pressure waves or pulsations in the conduit cause the fluid in the side branch chamber to pulsate, and if the side branch or stub is properly dimensioned a condition of resonance will exist causing the amplitude of the fluid oscillations in the stub to reach a maximum value. If a frictional resistance to fluid movement is provided in the side branch chamber, the movement of the pulsating fluid relative to this resistance will frictionally dissipate the power of the pressure pulsations.

In a side branch attenuator of this type, the fluid in the stub must of course actually compress and expand each time that the pulsation pressure increases and decreases in the main line. Consequently, the capacity of the device for attenuating pulsations depends in large part upon the compressibility or "compliance" characteristic of the fluid in the side branch chamber. For this reason it is highly desirable that the fluid within the chamber consist of a body of gas confined within the upper portion of the chamber, together with a column of liquid in the lower portion of the chamber communicating with the conduit. The gas then gives to the overall fluid mass the desired compressibility, while the liquid gives mass to the fluid to maximize the energy dissipating effect.

With this in mind, there have been developed in the past "accumulator" devices which have consisted of a gas bag positioned in the top of a side branch chamber, above a column of liquid, and acting to compress and expand in response to the pressure variations accompanying pulsations in the main line. Unfortunately, however, this type of device has not proven too practical or effective, for a number of reasons. In the first place, the constant flexing of the elastic envelope has invariably caused it to break eventually, regardless of the amount of care taken in attempting to prevent such breakage. Further, such a gas bag arrangement can only be resonant to and filter out one pulsation frequency (or a narrow range of frequencies), whereas it is usually desirable to eliminate a very wide frequency range if possible. In prior accumulators of this type, it has not been possible to successfully eliminate the gas bag, and allow direct contact of the gas with the liquid; since the gas, if it directly contacts the liquid, may be entrained or dissolved in the liquid, so that after only a very short period of operation the system will be devoid of gas and cease to function.

The general object of the present invention is to provide a side branch attenuator of the above general type, in which gas above liquid is utilized in the side branch chamber, but in which it is entirely unnecessary to contain that gas within an envelope. The device is so designed that it continually and reliably maintains the body of gas in the chamber, and automatically replenishes that gas as necessary to maintain the desired compliance characteristics in the chamber. Specifically, this result is achieved by actually developing the gas which is utilized in the upper portion of the chamber solely from the same liquid that is contained in the lower portion of the chamber (and which may also be the same fluid that is flowing through the main conduit). In some forms of the invention, this column of gas is maintained by supplying or conducting sufficient heat to the side branch chamber to keep a desired vapor pressure above the liquid, and thus maintain a substantial amount of the liquid in its gaseous phase. This gaseous phase ordinarily consists primarily of the vapor of the liquid, but of course may also include gas which had initially been dissolved or entrained in the liquid. In another form of the invention, the gas is developed from the liquid (where it is water) by actually electrolyzing the water to form hydrogen and oxygen.

To enable the device to be effective for a wide range of frequencies, the attenuator should preferably be designed to contain several different side branch chambers of the above discussed type. In that case, the gas developing means may be so positioned or constructed as to maintain different liquid levels in the different chambers, so that they are resonant to different frequencies. To attain the same result, the chambers may purposely be made of different sizes, so that they resonate at different frequencies.

The above and other features and objects of the present invention will be better understood from the following detailed description of the typical embodiments illustrated in the accompanying drawings in which:

Fig. 1 is a side view, partially broken away, showing a first form of pulsation attenuator constructed in accordance with the invention;

Fig. 2 is a view similar to Fig. 1, but showing a second form of pulsation attenuating device;

Fig. 3 is a horizontal section taken on line 3—3 of Fig. 2;

Fig. 4 is a horizontal sectional view corresponding to Fig. 3, but showing a third form of the invention;

Fig. 5 is a view similar to Figs. 1 and 2, but showing another form of the invention;

Fig. 6 is a representation of another form of the invention;

Fig. 7 is a section taken on line 7—7 of Fig. 6; and

Figs. 8 and 9 are showings of two additional forms of the invention.

Referring first to Fig. 1, I have shown at 10 a portion of a piping system, typically formed of conventional metal pipe, and through which a liquid 11 is being pumped by pump 112. It may be assumed that this is an instance in which the pulsations which are to be eliminated are produced by the operation of the pump itself. Pump 112 may be of the reciprocating positive displacement type, in which case the pulsations or pressure waves set up in conduit 10 by the pump will have a fundamental frequency corresponding to the frequency of the pump. It is also possible for pulsations to be set up by other types of pumps, as for instance by turbine devices, and it is therefore contemplated that the attenuator of Fig. 1 may be utilized in conjunction with any pump which produces pressure pulsations in the liquid being handled.

In the Fig. 1 arrangement, the pulsation attenuator is represented generally at 12. This attenuator desirably projects upwardly from the upper surface of conduit 10, to form a side branch chamber 13 communicating at its lower end with the interior of the conduit. This side branch chamber 13 may typically be formed by an outer cylindrical vertically extending rigid housing 14, which is lined internally by a correspondingly cylindrical layer of heat insulating material 15. At their upper ends, the outer housing 14 and the lining 15 form horizontal top walls 16 and 17, so that the chamber 13 is closed and is sealed fluid tight, except for its communication with the interior of conduit 10. At its lower end, the outer housing 14 is peripherally and continuously welded at 18 to pipe 10, along a curving line which is defined by the intersection of the two cylinders 10 and 14. This weld 18, or any other suitable type of fluid tight connection between the two parts 10 and 14, effectively prevents the leakage of any liquid from the interior of parts 10 and 14 to their exterior. The insulation 15 within the side branch chamber or "stub" may be formed of any type of material which is capable of withstanding the fluid to be contained within the device, at the pressures and temperatures which are expected to prevail. It will of course be apparent that the side branch chamber need not have the cylindrical configuration shown in Fig. 1, but this particular shape is shown merely as one that is relatively easy to form.

The liquid 11 flowing within conduit 10 extends upwardly into the side branch chamber 13 under the influence of the pressure of the liquid. In order to maintain a body of gas 19 within the upper end of the side branch chamber 13, I provide in the upper end of the chamber a heater 20, which may be a conventional electrical heater suitably designed to withstand contact with the fluid contained within the chamber. This heater may project downwardly from the center of the upper walls 16 and 17 of the chamber, and projects to the outside of the chamber for connection to a pair of electrical leads 21 connected to an appropriate power source 22. A rheostat or other control element 23 is provided in the circuit for controllably regulating the temperature of heater element 20. The heater 20 is of course suitably sealed with respect to the parts 16 and 17, to prevent the leakage of any fluid from within the side branch chamber at the location of the heater. Heater 20 is designed to have a heating capacity such that it will convert some of the liquid 11 to its gaseous or vapor phase, and will maintain a sufficient vapor pressure in the upper end of the side branch chamber to maintain the liquid level 24 in the chamber at a location spaced beneath the top of the chamber. Beneath liquid level 24, there is provided within chamber 13 a structure 25 which is designed to allow liquid to flow upwardly and downwardly therethrough, and yet which offers a very substantial amount of frictional resistance to such flow of the liquid. This structure 25 may be any type of perforated baffle or screen arrangement, desirably extending across the entire cross-section of the chamber, and suitably secured in fixed relation to its side walls 14 and 15. In Fig. 1, structure 25 is typically represented as consisting of a series of superimposed horizontally extending screens, formed of a material adapted to withstand the liquid 11 which is being handled. These screens may either be attached to liner 15, or to outer housing 14. The liner 15 may typically be formed of asbestos, or a suitable asbestos based insulating material.

To now describe the operation of the Fig. 1 apparatus, assume that pump 112 is in operation and is pumping liquid through the piping system 10. It also may be assumed that the pump maintains continuously a rather substantial super-atmospheric pressure within piping 10, and that the pump produces, over and above this base pressure, a series of pulsations forming pressure waves which progressively advance within liquid 11 from the pump, and to the right as seen in Fig. 1.

As the pulsations or pressure waves move through conduit 10, they cause the liquid pressure at the lower end of side branch chamber 13 to alternately increase and decrease. When the pressure at the bottom of this chamber increases, this rise in pressure causes the liquid level 24 within chamber 13 to rise correspondingly, to thereby compress the gas or vapor 19 within the upper end of the chamber. The increase in gas pressure, and the increase in hydrostatic head produced by the rise in liquid level, tend to counteract the increase in pressure at the lower end of the side branch chamber, and to thus limit the upward movement of liquid resulting from the pressure pulse at the lower end of the chamber. The subsequent decrease in pressure at the lower end of the side branch chamber, as a rarefaction portion of the pulsation wave passes the chamber, causes the liquid level in the chamber to fall, so that the liquid level is continually rising and falling in step with the pulsations in the conduit 10. As the liquid rises and falls, it moves upwardly and downwardly through the screen or grill structure 25, to thus dissipate a large portion of the energy of the pulsation wave, by virtue of the friction between the moving liquid and the screen structure. Also, this screen structure 25 serves to essentially isolate the conduit 10 from the interior of the upper portion of chamber 13, to thus prevent too much loss of heat from the upper portion of the chamber into the conduit by migration of heated liquid from the chamber into the conduit.

Preferably, the dimensions of chamber 13, and the temperature to which heater 20 is raised, are such as to give to chamber 13 and its contained liquid and gas a resonant frequency corresponding substantially to the frequency of the pulsations produced in liquid 11 by pump 112 (or by any other source of pulsations). As will be discussed later in describing the mathematical design calculations for the present type of device, it can be predicted that, for a particular size and shape of chamber 13, the maintenance of approximately a predetermined normal or mean liquid level 24 within the chamber will render the chamber resonant at a particular frequency. When the frequency of the pulsations to be eliminated is known, the chamber is then designed in accordance with the later to be discussed formulas, so that the chamber will resonate at the frequency of the pulsations, and so that the upward and downward movements of the liquid within chamber 13 will be relatively great (because of resonance), and a maximum amount of energy will then be dissipated by movement of the fluid through the screen structure 25. In operation, rheostat 23 is so adjusted as to maintain heater 20 at exactly the proper temperature for maintaining the mean liquid level at the desired location 24. If necessary, a liquid level sensing device 26 may be provided, typically including level responsive electrodes 126 and an indicator 226, so that an operator may know what the liquid level is within the chamber, and may adjust rheostat 23 until the mean liquid level is at the desired location. During the pulsations, the liquid level will of course rise above this desired point, and fall beneath that point, but the heater may be adjusted so that the mid point of the vertical oscillation will be at approximately a desired level, typically by so adjusting the heater as to maintain the liquid level at all times between the two spaced electrodes 126. In other instances it may be calculated in advance, or determined in advance by experimentation, that a particular current fed to heater 20 will provide just the right amount of vapor or gas within the upper portion of chamber 13 to maintain resonance at a desired frequency.

Figs. 2 and 3 show a variational form of the invention which is similar to that of Fig. 1 except that the interior of the device is subdivided into a plurality of side branch chambers all resonating at different frequencies. The housing 14a of Figs. 2 and 3 may be of essentially the same cylindrical configuration as housing 14 of Fig. 1, but preferably is of a larger diameter with respect to the main vertical axis 27 of the housing. This housing 14a is attached in fluid tight relation to the upper side of conduit 10a, which contains the liquid 11a being pumped, and the interior of housing 14a communicates through an opening 28 in the upper side of pipe 10a with the interior of the pipe. As in Fig. 1, housing 14a is lined along its cylindrical side wall and across its horizontal top wall 16a by a heat insulative material 15a.

The interior of housing 14a is partitioned by means of a number of concentric vertically extending tubes 29, all centered about axis 27, and typically all welded or otherwise secured in fixed relation at their upper ends to top wall 16a of the device. The lower ends 30 of tubes 29 may terminate at approximately the lower end of housing 14a, and therefore at the upper portion of pipe 10a. As will be apparent, the tubes 29 divide the interior of housing 14a into a central cylindrical vertically extending chamber 31, and a series of annular concentric outer chambers 32, 33, 34, 35 and 36, all extending vertically, and all communicating at their lower ends with the interior of pipe 10a. These various chambers 31 through 36 function in the Fig. 2 device as a plurality of side branch chambers having different liquid levels 24a therein, and therefore resonating at different frequencies. In order to attain these different liquid levels, the heater 20a in Figs. 2 and 3 is positioned within the upper end of inner chamber 31, to directly heat the upper portion of that chamber, and to indirectly heat the other chambers 32 to 36 which extend about central chamber 31. Because the temperature is highest within the central chamber, and progressively decreases toward the outer chamber 36, since there is of course some loss of heat from the device through insulation 15a, the vapor pressure within the upper portions of the different chambers becomes progressively smaller toward the outer peripheral chamber 36, and therefore the liquid levels 24a progressively rise as they advance toward outer chamber 36. Small apertures 37 may be provided in the upper portions of walls 29, to allow communication between the upper gas spaces within the different side branch chambers, so that the heater 20a may generate vapor within the inner chamber 31, and that vapor can then pass outwardly through apertures 37 in the different partitions to enter the upper ends of the other side branch chambers. Instead of thus using one heater for all of the side branch chambers, it will of course be apparent that the chambers can be non-communicating, and have individual heaters, if desired.

The heater 20a may be predesigned to maintain particular predetermined mean liquid levels in the various chambers, when a certain predetermined current is fed to the heater, and when other known pressure conditions, etc., exist. On the other hand, if desired, a rheostat or other control such as that shown at 23 may be provided for heater 20a, and that control may be regulated to maintain the desired liquid levels, typically as indicated by a level responsive device such as that shown at 26 in Fig. 1. Within the lower portions of all of the chambers 31 through 36, there are desirably provided screen or grill structures 25a which resist upward and downward movement of liquid within the chambers, and thus dissipate energy when the liquid does move upwardly and downwardly.

The device of Figs. 2 and 3 is especially designed for use in situations where pulsations of a number of different frequencies may be carried within the liquid 11a which is being pumped through conduit 10a. In this case, the liquid and gas maintained in each of the various side branch chambers 31 through 36 will function to resonate upwardly and downwardly in response to pulsations of a predetermined frequency, or within a predetermined frequency range. Thus, each of these chambers, in resonating, will dissipate or use up most of the energy of the pulsations of that particular frequency. Since all of the various chambers in Figs. 2 and 3 resonate at different frequencies, because of their different liquid levels, the entire device will act to attenuate or eliminate most of the pulsations over a rather wide range, so that virtually no pulsations are allowed to pass the location of the device 12a.

The multiple chamber idea of Figs. 2 and 3 is of course not limited to the particular circular chamber arrangement shown in those figures. Instead, it is contemplated that a plurality of side branch chambers of any desired shapes may be utilized, so long as they contain liquid up to a predetermined level, and then contain the gaseous phase of that liquid above the desired level in each chamber. As an illustration, Fig. 4 is a view corresponding to Fig. 3, but showing an arrangement in which the outer housing 14b is of rectangular or square horizontal section, and in which it is divided by vertical partitions 29b into a number of vertically extending side branch chambers 31b, all of rectangular or square horizontal section. The heater 20b in this form of the invention may be contained within a central one of the chambers 31b, in its upper portion at a location corresponding to the location of heater 20a in Fig. 2, or if desired individual heaters can be used for the different resonators. In any of the forms of the invention, it is contemplated that the heater 20a or 20b may be a heat exchanger, consisting of tubes through which a heating fluid is passed, instead of being an electrical heater as shown in Figs. 1 to 3. Consequently, I have typically represented the heater 20b of Fig. 4 as being such a heat exchanger. The tubes of course extend to the outside of housing 14b at its top, to receive heating liquid. The various partitions 29b contain apertures 37b near their upper ends, and providing communication between the upper gas spaces within the various chambers as do apertures 37 of Fig. 2, so that vapor or gases generated within the central chamber by heater 20b may pass to the outer chambers. Housing 14b is lined along its sides and top by heat insulative material 15b. As in Figs. 2 and 3, the heater 20b maintains a higher temperature toward the center of the device than toward its periphery, so that the liquid levels progressively rise toward the outside of the device, to provide chambers of different resonant frequencies, and thus allow the entire device to filter out a wide range of pulsation frequencies. The Fig. 4 device has not been shown in vertical section, since such a sectional view would correspond substantially exactly to the showing of the second form of the invention in Fig. 2. It would of course include screen material or grill work such as that shown at 25a, for dissipating the pulsation energy.

In some instances, it may be possible to raise the temperature of the liquid sufficiently to develop the desired gaseous phase without actually providing a heater in the device, if the liquid being conducted through the system is at a low enough temperature that it can develop a substantial vapor pressure merely by exposure to the ambient temperature, or to some temperature which is available in the vicinity of the apparatus. In Fig. 5 I have typically shown such an installation, which might for example be a system in which liquid oxygen 11c was being pumped at very low temperature through a conduit 10c, which might be heat insulated as represented at 140. This Fig. 5 device may typically be identical with the Fig. 2 device, except that the insulation 15a is eliminated from the interior of housing 14c and the heater 20a is also of course eliminated. The absence of the heat insulating material within housing 14c allows heat from the outside of that housing (say from an outside heat source or sources typically represented at 20c) to pass through the walls of the housing (usually made of a heat conductive metal), and that transmitted heat raises the temperature within the upper ends of the various side branch chambers 31c to 36c to values at which the developed vapor pressures maintain bodies of gas in the upper portions of those chambers. In this situation, the outer chamber 36c will be heated to the highest temperature, and the temperatures will progressively fall as the chambers approach the center one 31c. As a result, the liquid levels within the chambers will progressively rise toward the center, and the desired different resonant frequencies for the different chambers will be provided for. Apertures 37c in the upper portions of partitions 29c allow restricted communication between the gas spaces in the various side branch chambers. Also, in the lower portions of the chambers, the grill work or screen 25c should of course be provided. The apparatus of Fig. 5 is so designed that, under the particular conditions which are to be encountered in use, the desired liquid levels will be maintained, so that a certain range of pulsation frequencies will be filtered out.

Figs. 6 and 7 show another form of the invention, in which there is provided a multiple chamber pulsation dampening assembly which is adapted to be connected into a main liquid conducting piping system 10d, and which assembly includes a horizontally extending pipe 110d, and a series of pulsation attenuator units 12d projecting upwardly from pipe 110d. The pipe 110d may have flanges 111d at its opposite ends, for connection to corresponding flanges of adjoining sections of the main piping system 10d, so that the main stream of liquid 11d flows axially through pipe 110d.

Each of the attenuator units 12d has an outer housing 14d, which may be of cylindrical vertically extending configuration, and which may taper downwardly at its lower end, as shown at 114d, to the location of weld line 118d along which the housing 14d is welded to pipe 110d in fluid tight sealing relation. As will be apparent, the pipe 110d has an opening at its upper side at the location of each of the housings 14d, and into which the lower portion of the housing is connected by the weld at 118d, in a relation placing the interior of the housing 14d in communication with the interior of pipe 110d.

Across its upper side, each of the housings 14d is closed by a horizontal top wall 16d, which may be suitably bolted to a flange on housing 14d, and which is sealed with respect to that flange to prevent the leakage of any fluid from within the interior of the housing. Along the inner side of the vertically extending wall of housing 14d, there is provided a cylindrical tubular body of heat insulating material 15d, having an inner cylindrical vertically extending surface which defines the sides of the inner fluid receiving space within unit 12d. The top of this space is defined by an upper horizontal wall 17d of similar heat insulation. In this and the other forms of the invention, the heat insulation is of a type adapted to effectively withstand the fluids and temperatures which may be encountered, or the insulation may be lined by a material capable of withstanding these fluids and temperatures.

The fluid containing space within the interior of each of the units 12d of Figs. 6 and 7 is preferably subdivided into a group of separate, non-communicating side branch chambers, which may be of different horizontal cross-sectional areas in order to render the different chambers resonant to different pulsation frequencies. These different side branch chambers may be formed in each of the units 12d by provision of a series of imperforate vertically extending walls 29d (see Fig. 7), which extend radially outwardly from the main vertical axis 27d of the attenuator, to subdivide the cylindrical space into a series of different chambers 32d, 33d, 34d, 35d and 36d of different angular extents. The partitions or walls 29d preferably extend through the entire vertical extent of the cylindrical fluid receiving space, so that the various chambers are not in communication except through the interior of pipe 110d at their lower ends.

At the upper end of each of the chambers 32d, 33d, etc., the attenuator unit 12d carries a heater element 20d, which may be an electrically operated element attached to top wall 16d in sealed fluid tight relation. The resistance to upward and downward movement of the liquid 11d within the various chambers 32d, 33d, etc. may be offered by a series of vertically extending ceramic tubes 25d, which may be provided in a sufficient number to substantially fill the cross sectional area of each of the chambers, to form restricted fluid passages within and between the various tubes. These tubes may be supported in their illustrated positions in any suitable manner, as by support on a bottom perforated screen 125d extending across the bottom of the cylindrical fluid receiving space within the interior of each of the units 12d. The normal liquid level within each of the various side branch chambers may be at a point slightly above the upper ends of the ceramic tubes 25d, as is indicated in Fig. 6.

It can be readily seen that when the vapor in each resonator nearly fills the entire resonator volume, that resonator in which the liquid level is high will respond to the low frequencies and conversely that resonator in which the liquid level is low will respond to the higher frequencies. An additional factor which relates to the degree of coupling of the pressure pulsation in the main pipe line with the resonator system is the cross-section of the resonator. In general, it is found that for nearly equal efficiencies of response that the ratio of the cross-section to the liquid length must be substantially the same for each resonator.

In order to control the liquid level within the units 12b, I find it desirable in some cases to provide automatic monitoring apparatus, including a transducer or other pickup unit 40 which is exposed to the pulsations in the liquid 11d at a point beyond units 12d in the direction of liquid flow. This transducer 40 is responsive to the pulsations, and controls an electrical current in accordance with those pulsations. That current is amplified by an amplifier 41, and may then pass through a filter circuit 42 which functions to separate out a particular frequency to which the automatic control is intended to respond. The filtered current is then utilized in some way to control the operation of one or more of the heaters 20d, as by passing the current to a differential network switch circuit 43, which controls the supply of electrical power from a power source 44 to the heater or heaters. It is contemplated that in most instances all of the various heaters may be controlled in unison by a single switch 43, to turn the heaters on and off automatically in response to increases and decreases in the intensity of pulsations of a predetermined frequency or band of frequencies which reach transducer 40.

In some instances, it may be desirable to utilize an attenuator of the present type in a system in which the main fluid flowing through the system is a gas. Such an arrangement is represented in the Fig. 8 variation of the invention. In Fig. 8, the main pipe line or conduit is represented at 10e, and has a gas flowing therethrough. The attenuator unit 12e may in this case typically be the same as one of the units 12d of Fig. 6, and is connected to conduit 10e by means of a pipe 18e which is shaped to form a liquid trap between conduit 10e and attenuator 12e. More specifically, the line 18e may connect into the underside of conduit 10e in sealed relation at 45, and may then extend first downwardly, then horizontally at 46, and then upwardly to connect into the bottom opening of the outer housing 14e of attenuator unit 12e. This line 18e contains a liquid 47, which may extend upwardly within the long branch of line 18e to a level such as that shown at 48. The liquid fills the entire line 18e, and extends from its shorter branch upwardly into the interior of attenuator unit 12e to a proper level for attenuating or resonating to a predetermined frequency or band of frequencies of pulsations in line 10e. The interior of unit 12e may be subdivided into a number of differently dimensioned side branch chambers, as in Figs. 6 and 7, and this unit 12e may in all other respects be substantially identical with unit 12d of Figs. 6 and 7.

The device of Fig. 8 has one very decided advantage over conventional gas line attenuators, in which the entire device contains only gas and no liquid. In particular, the use of liquid in the Fig. 8 arrangement increases the mass of the pulsating fluid for a given volume, as compared with an all gas system. Consequently, it is possible with this type of device to utilize a much smaller overall structure than is necessary when only gas is employed within the side branch assembly.

In some cases, the liquid 47 within the trap of Fig. 8 may be a liquid which is dissimilar in composition to the gas 11e flowing through main conduit 10e. However, where possible, it is preferred that the liquid 47 be a liquid which is itself normally present in substantial amounts in the main gas within conduit 10e. This liquid may be an entrained liquid, or the gas may be of a composition such that a portion of the gas normally tends, under the conditions encountered in conduit 10e, to change to a liquid state and accumulate within that conduit. Where the gas is of a type normally producing accumulations of liquid within conduit 10e, this liquid may be allowed to drain into trap 18e, to thus automatically and continually maintain a supply of liquid within the trap. As an example, the gas flowing through line 10e might be natural gas, which normally carries a substantial amount of oil entrained in the gas, and which oil would have a natural tendency to accumulate in the bottom of conduit 10e and thereby maintain the trap filled with oil. The heaters 20e of unit 12e would then be operated at proper temperatures to maintain a sufficient amount of the oil in vapor form above the liquid within unit 12e, to produce the desired resonating and pulsation attenuating characteristics.

In all of the forms of the invention described thus far, the vapor pocket within the upper interior of the side branch chamber or chambers is maintained by supplying heat to the chamber in an amount sufficient to vaporize some of the liquid contained within the lower portion of the chamber. It is also possible to maintain these vapor pockets by supplying energy to the chambers in a form other than heat. Fig. 9 shows one such arrangement, in which the energy is supplied to the liquid directly as electrical energy, and functions to decompose the liquid by electrolysis into gaseous components. This arrangement is particularly useful where the liquid 11f flowing through main conduit 10f is water (having some impurities to render it electrically conductive), or is an aqueous solution of some type. The attenuator unit 12f of Fig. 9 includes a cylindrical housing 14f, connecting at its lower open end 18f, in sealed relation, to the upper side of conduit 10f. The liquid 11f is allowed to extend upwardly into the housing 14f, which housing may be subdivided internally into two separate chambers by a vertical imperforate partition 29f. The two electrodes 20f of the electrolyzing circuit may project downwardly in suitably insulated condition into the two chambers at opposite sides of partition 29f, and they are electrically energized by a direct current power source represented at 22f. The potential fed to electrodes 20f is of a value sufficient to decompose the liquid, by separating the differently charged ions within the liquid, and causing those ions to be neutralized in charge at the electrodes or poles, and then to accumulate as a gaseous phase within the two chambers at the opposite sides of partition 29f. More particularly, water is dissociated in this manner into gaseous hydrogen and oxygen, accumulating in the two chambers respectively, to form gas pockets above the liquid levels 51 and 52.

Within the lower portions of the two side branch chambers in Fig. 9, there may be provided ceramic tubes or other flow restricting means at 25f, to serve the function of tubes 25d in Fig. 7. The power source 22f is so designed or regulated as to maintain the liquid levels 51 and 52 at predetermined mean levels which will give the two side branch chambers certain desired resonating frequencies. It will of course be obvious that an automatic control system such as that shown in Fig. 6 can be employed in this Fig. 9 arrangement, or in any of the other forms of the invention.

To facilitate understanding of the functioning of the present device, it might be stated that the frictional dissipation of power within the various side branch chambers 19, 31 to 36, 31b, 31c to 36c, etc, by virtue of the upward and downward movement of the liquid within the chambers, corresponds in theory to the $I^2R$ loss in an ohmic resistance in an electrical circuit. Also, in the electrical analogy, the storage capacity or volume of the side branch chamber corresponds to electrical capacitance of a circuit, and the mass inertia of the fluid in the side branch chamber corresponds precisely to the electrical inductance. Thus, it is necessary merely to control the storage capacity of the chamber, and the mass inertia of the fluid, in order to predesign a particular chamber for resonance at a particular pulsation frequency. In order to assure an adequate and complete disclosure of the present invention, I will discuss below in some detail the mathematics involved in actually designing a device of the present type, so that a particular one of the chambers will resonate to a particular desired frequency.

*Mathematical theory of the attenuator*

Two conditions governing the flow at the junction of the main pipe line flow and the entrance to the side branch are required to establish the relation between the transmitted wave and the incident wave coming from the source upstream. The necessity for the two conditions simply reflects the fact that we must establish the magnitudes of two waves simultaneously. The transmitted wave and the reflected wave are both unknowns. Two unknowns demand two defining equations.

The two conditions at the junction are:

(1) Equality of pressure at the junction for the upstream piping, the downstream piping, and the side branch.

(2) Mass flow is conserved. The fluid that enters the junction from the upstream side must leave either downstream or by the side branch. The rates of flow refer, of course, to a given instant of time.

These conditions can be recognized as nothing more than the Kirchhoff laws used in electrical circuitry.

The pressure waves in the pipe must satisfy the wave equation in addition.

$$\frac{\partial^2 p}{\partial x^2} = \frac{1}{c^2}\frac{\partial^2 p}{\partial t^2} \qquad (1)$$

Where $c$ is the velocity of propagation of pressure waves in the pipe, "$x$" denotes distance along the pipe from an arbitrary origin and "$t$" denotes the time. "$p$" in Equation 1 designates the pulsation pressure which is superimposed on the static absolute pressure $p_0$ in the pipe fluid.

Fundamental solutions of Equation 1 pertaining to a given angular frequency "$\omega$" ($\omega = 2\pi f$ where $f$ is the number of cycles per second), are:

$$e^{i\omega\left(t-\frac{x}{c}\right)} \text{ (wave travelling to the right)} \qquad (2)$$

and $$e^{i\omega\left(t+\frac{x}{c}\right)} \text{ (wave travelling to the left)} \qquad (3)$$

"$i$" denotes $(-1)^{\frac{1}{2}}$

For the side branch system with a multiplicity of individual resonators we find, after some tedious analysis:

$$\frac{p_{tr}}{p} = \left[1 + \frac{i\varphi\omega c}{2B}\sum_j \frac{A_j}{\left[\left(\frac{nP_jA_j}{V_j}-\omega^2L_j\varphi\right)+i\omega\mu_j\right]}\right]^{-1} \qquad (4)$$

Where the symbols in the preceding equation have the following meanings:

$p_{tr}$ = pressure of transmitted wave
$p$ = pressure of incident wave
$\varphi$ = density of fluid in main pipe
$\omega = 2\pi f$
$f$ = frequency in cycles/second
$c$ = velocity of propagation of pressure waves in the fluid of the pipe
$B$ = cross-sectional area of main pipe
$A_j$ = cross-sectional area of $j$th individual side branch
$P_j$ = absolute pressure of vapor in $j$th resonator (absolute units)
$V_j$ = volume of vapor in $j$th resonator
$n$ = polytropic transformation constant for the vapor ($P_jV_j^n$ = constant)
$L_j$ = length of liquid column in $j$th resonator
$\mu_j$ = friction coefficient for fluid motion in $j$th resonator: friction force $$j = \mu_j A_j \left(\frac{d}{dt}L_j\right)$$

$i = (-1)^{\frac{1}{2}}$

The resonance frequencies of the individual resonators is $$f_{j\text{ res}} = \frac{1}{2\pi}\left(\frac{nP_j}{\varphi}\right)^{1/2}\left(\frac{A_j}{V_jL_j}\right)^{1/2} \qquad (5)$$

Where we have referred in this disclosure to the designing of a particular side branch chamber to resonate at a certain frequency, the chamber is merely designed to satisfy Equation 5 at the desired frequency.

As an example let us consider the situation where the fluid pressure in the pipe is about 100 p.s.i. Let us further choose $V_j$ so that it is about the same magnitude as the volume of liquid in the $j$th resonator $$V_j \simeq A_jL_j \qquad (6)$$

We would find then (for water as the circulated fluid).

$$f_{j\text{ res}} = \left(\frac{1}{2\pi}\right)\left(\frac{n(100)(144)(32)}{62}\right)^{1/2}\frac{1}{L_j} \qquad (7)$$

$$\simeq \frac{13}{L_j} \text{ cycles/sec.} \quad n \simeq 1 \qquad (8)$$

If we wanted this resonance at 100 cycles/sec., $L_j$ would become $$L_j = \frac{13}{100} \simeq \frac{1}{8} \text{ ft.} \simeq 1.5 \text{ inches} \qquad (9)$$

If the pressure went up to 500 p.s.i., the approximate value of $L_j$, under the particular condition assumed for $V_j$, would be $$\left.\begin{array}{l}L_j \simeq 3 \text{ inches} \\ P_j \simeq 500 \text{ p.s.i.} \\ f_{\text{res}} \simeq 100 \text{ c.p.s.}\end{array}\right\} \qquad (10)$$

For resonance at 20 c.p.s. under the conditions assumed for the above $$\left.\begin{array}{l}L_j \simeq 15 \text{ inches} \\ P_j \simeq 500 \text{ p.s.i.} \\ f_{\text{res}} \simeq 20 \text{ c.p.s.}\end{array}\right\} \qquad (11)$$

To cut down the length of $L_j$ for the very low frequencies, it would only be necessary to increase $V_j$.

I claim:

1. Apparatus for attenuating pulsations in a stream of fluid flowing within a conduit, comprising a side branch resonator chamber, means for placing a lower portion of said chamber in communication with said conduit with a column of liquid received in said lower portion of the chamber and subjected to said pulsations, gas developing means operable to produce gas in said chamber from said liquid in a quantity rendering the combined gaseous and liquid contents of the chamber essentially resonant to a predetermined pulsation frequency, a transducer responsive to variations in the intensity of pulsations in said conduit and operable to control an electrical signal in accordance with said variations, and automatic control means automatically responsive to changes in said electrical signal produced by said variations in the pulsations to regulate the development of gas by said gas developing means and thereby regulate the resonant frequency of said chamber.

2. Apparatus as recited in claim 1, in which said automatic control means include a filter circuit responsive to a predetermined frequency in the signal from said transducer, and means controlled by the output of said filter circuit for regulating said gas developing means.

3. Apparatus for attenuating pulsations in a stream of fluid flowing within a conduit, comprising a side branch resonator chamber, means for placing a lower portion of said chamber in communication with said conduit with a column of liquid received in said lower portion of the chamber and subjected to said pulsations, heater means operable to supply heat to said chamber in a quantity sufficient to develop and maintain vapor from said liquid in the chamber, and to thereby render the combined gaseous and liquid contents of the chamber essentially resonant to a predetermined pulsation frequency, a transducer responsive to variations in the intensity of pulsations in said conduit and operable to control an electrical signal in accordance with said variations, and automatic control means responsive to changes in said electrical signal produced by said variations in the pulsations to regulate said heater means and thereby regulate the amount of vapor in said chamber and the resonant frequency of the chamber.

4. Apparatus as recited in claim 3, including means in said chamber dividing a lower portion of the chamber into a plurality of restricted passages and thereby offering a resistance to the flow of liquid upwardly and downwardly in the chamber to frictionally dissipate the energy of said pulsations.

5. Apparatus as recited in claim 4, in which said automatic control means include a filter circuit responsive to a predetermined frequency in the signal from said transducer, and a switch circuit controlled by the output of said filter circuit for regulating said heater means.

6. Apparatus for attenuating pulsations in a stream of fluid flowing within a conduit, comprising a vertically extending hollow body of approximately circular horizontal cross section and closed at its upper end, means for placing the bottom of said body in communication with said conduit with a column of liquid received in said lower portion of the body and subjected to said pulsations, vertical partitions in the body dividing it interiorly into a plurality of vertical chambers having the horizontal cross section approximately of different size segments of a circle, and a plurality of individual heaters positioned to heat the liquid in said different chambers respectively and to form vapor from the liquid in the chambers.

7. Apparatus as recited in claim 6, including means in said chambers beneath said heaters offering resistance to the flow of liquid upwardly and downwardly in the chambers, said body including an outer essentially cylindrical metal shell having an essentially cylindrical lining of heat insulating material at its inner side.

References Cited in the file of this patent

UNITED STATES PATENTS

| | | |
|---|---|---|
| 2,081,799 | Doran | May 25, 1937 |
| 2,638,932 | Alexander | May 19, 1953 |